No. 753,704. PATENTED MAR. 1, 1904.
F. O. HARTMAN.
AUTOMATIC MAGNETIC CIRCUIT BREAKER.
APPLICATION FILED APR. 10, 1902.
NO MODEL. 5 SHEETS—SHEET 2.

No. 753,704. PATENTED MAR. 1, 1904.
F. O. HARTMAN.
AUTOMATIC MAGNETIC CIRCUIT BREAKER.
APPLICATION FILED APR. 10, 1902.
NO MODEL. 5 SHEETS—SHEET 4.

No. 753,704. PATENTED MAR. 1, 1904.
F. O. HARTMAN.
AUTOMATIC MAGNETIC CIRCUIT BREAKER.
APPLICATION FILED APR. 10, 1902.
NO MODEL. 5 SHEETS—SHEET 5.
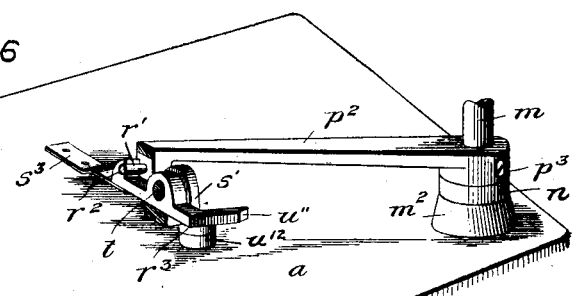
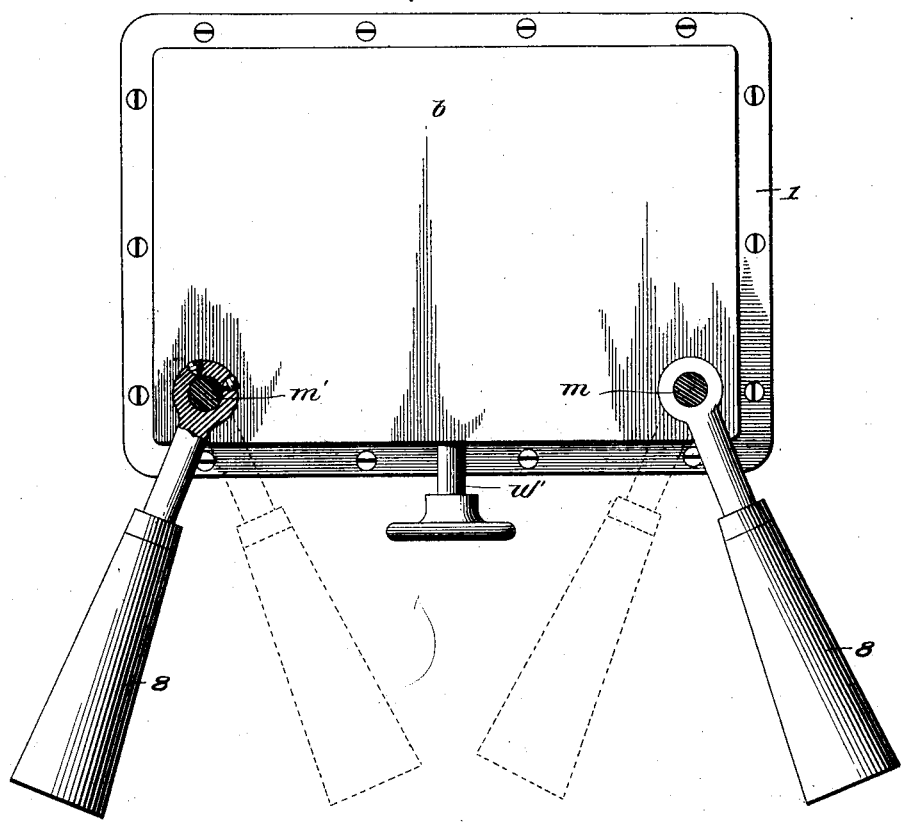

No. 753,704.                                                     Patented March 1, 1904.

UNITED STATES PATENT OFFICE.

FRANK O. HARTMAN, OF MANSFIELD, OHIO.

AUTOMATIC MAGNETIC CIRCUIT-BREAKER.

SPECIFICATION forming part of Letters Patent No. 753,704, dated March 1, 1904.

Application filed April 10, 1902. Serial No. 102,266. (No model.)

*To all whom it may concern:*

Be it known that I, FRANK O. HARTMAN, a citizen of the United States, residing at Mansfield, in the county of Richland and State of Ohio, have invented certain new and useful Improvements in Automatic Magnetic Circuit-Breakers, of which the following is a specification.

My invention relates to a double pole-circuit-breaker and one which can be used as a single-pole circuit-breaker, if desired.

The primary object of my invention is to provide a means for regulating the current in an electric circuit in such a manner that when the current exceeds a certain predetermined amount the circuit will be broken and the flow of the current cut off.

Another object of my invention is to afford a means for reducing or obviating arcing from the contact-pieces to the blocks when the circuit is broken, by submerging the operative mechanism of the circuit-breaker in an insulating liquid, such as oil, thereby practically eliminating any tendency toward sparking. It is also to be noted that by reason of the contact of the insulating liquid with such operative parts the mechanism is kept in perfect working order, all friction caused by foreign substances working into the bearings, and the corrosion of the parts is obviated to a great extent thereby. The insulating liquid also operates to prevent any injury to the operator otherwise liable to occur through arcing.

My circuit-breaker is adapted to be used in place of a non-automatic switch.

My invention also consists in certain other details of construction and combinations of parts, such as will be described more fully hereinafter, and particularly pointed out in the claims.

Figure 1:
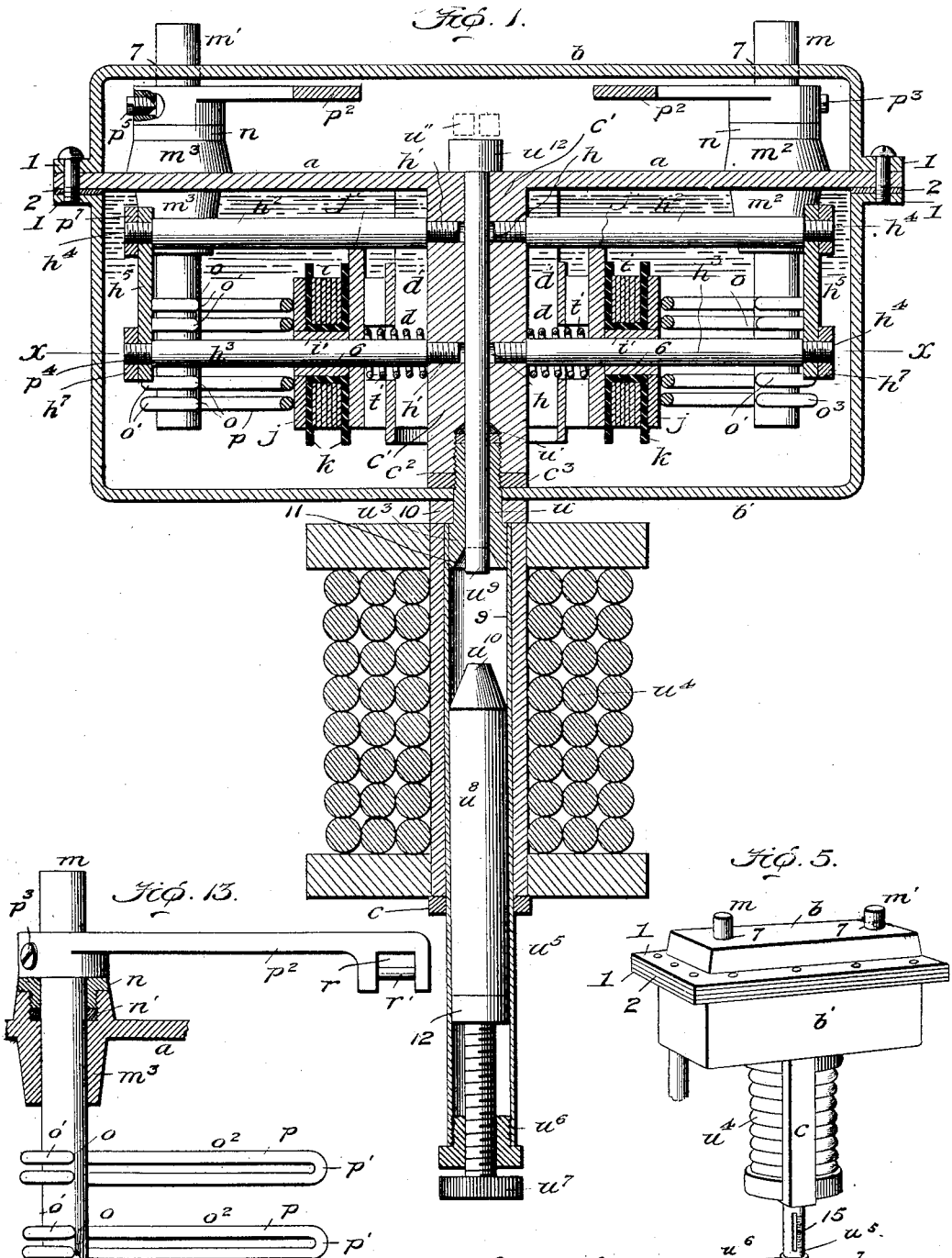
Figure 2:
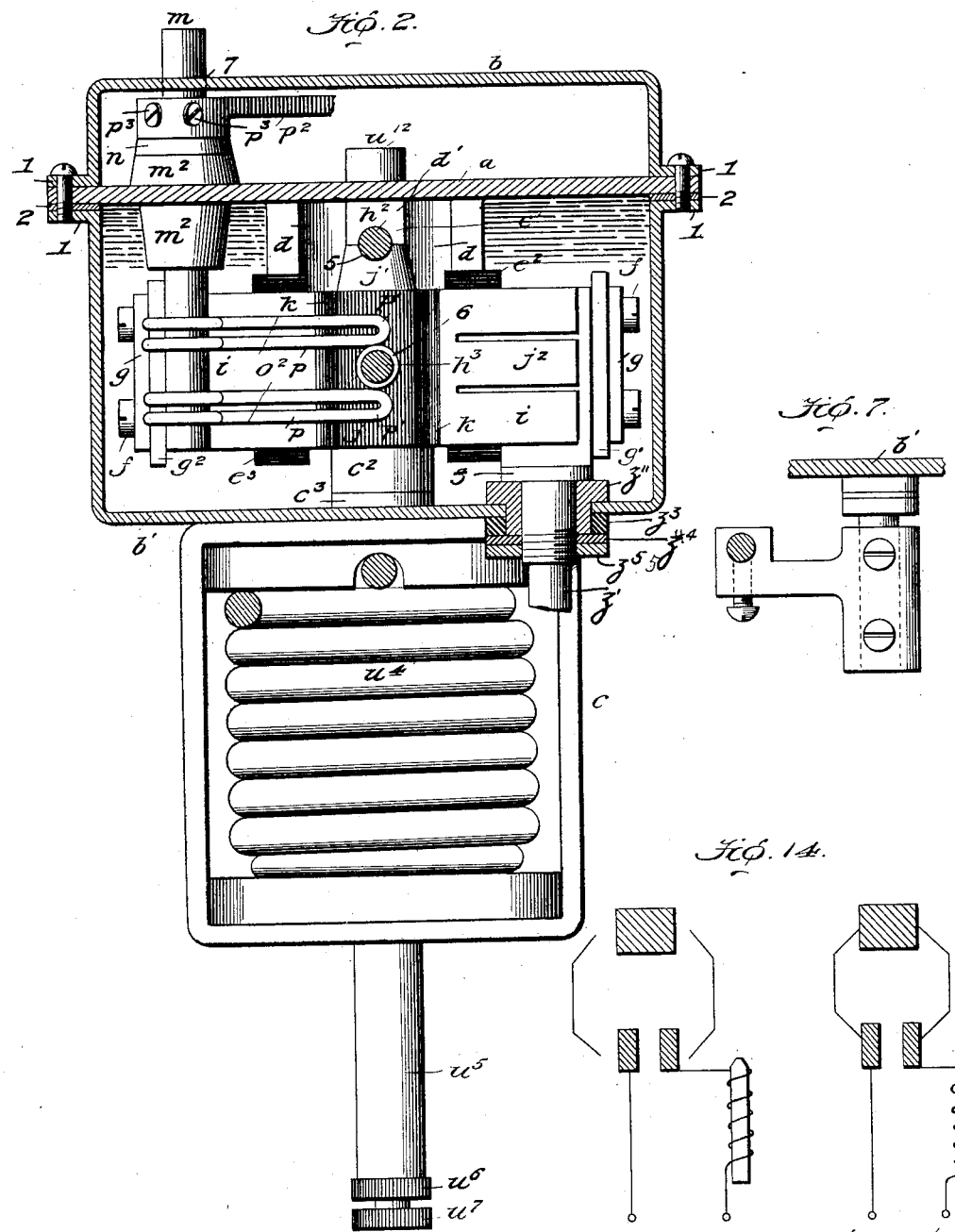
Figure 3:
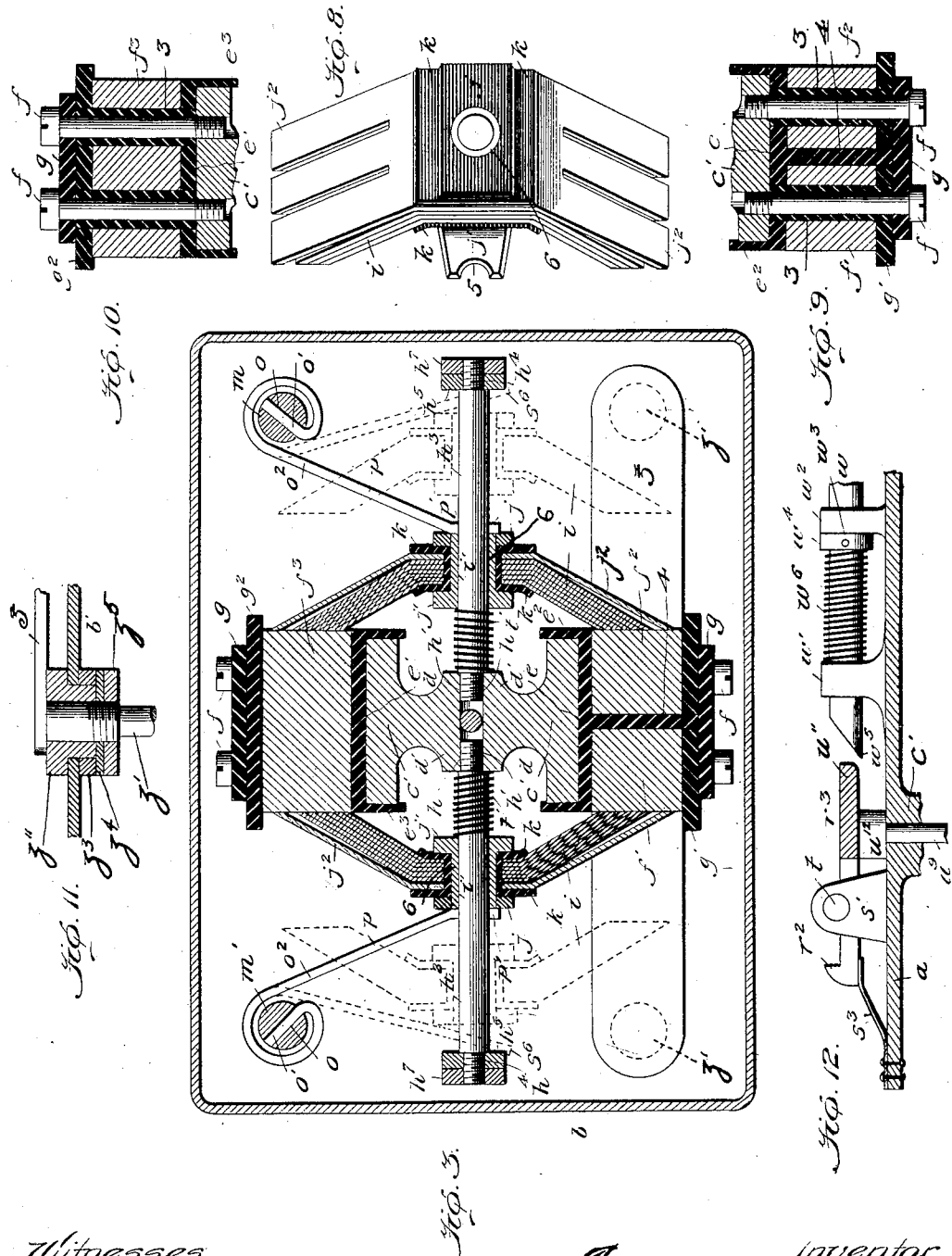
Figure 4:
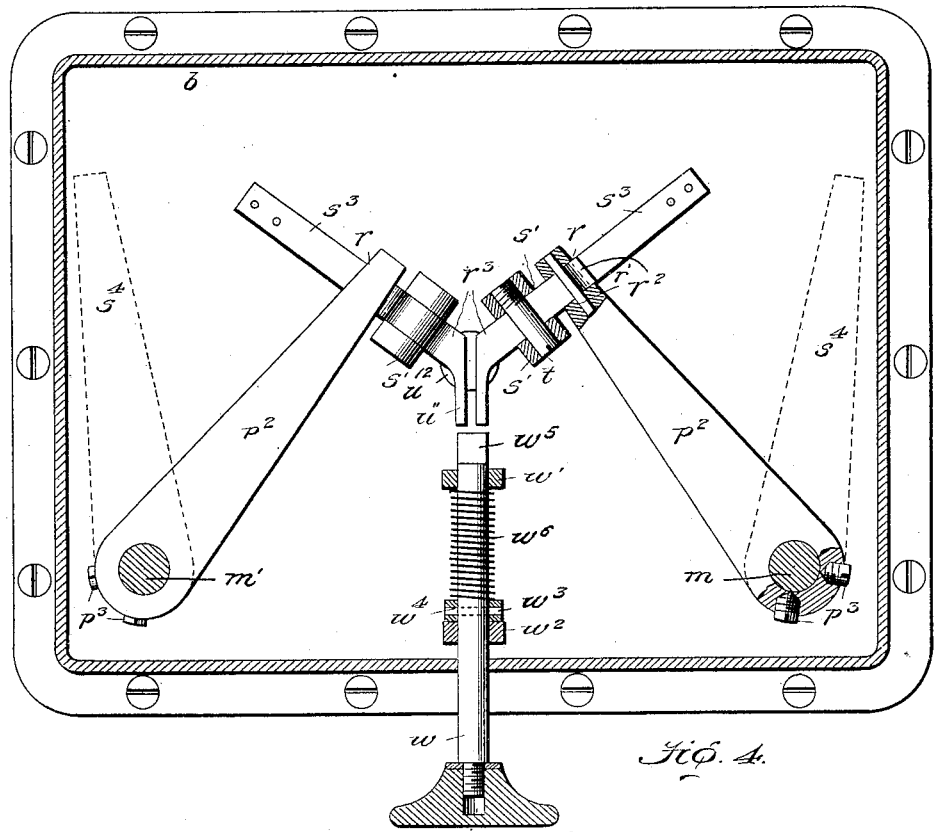
Figure 6:
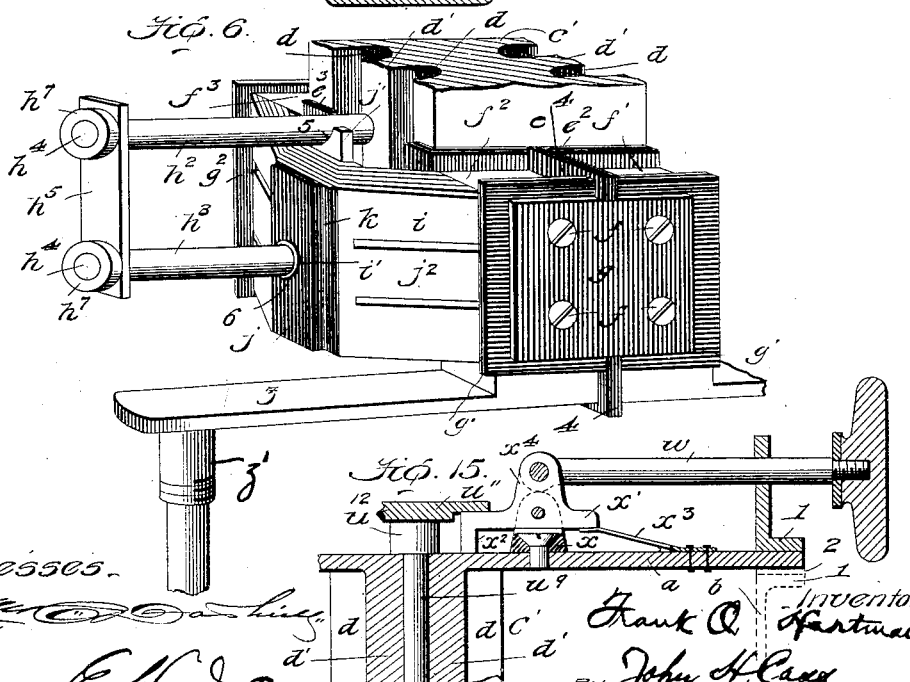
Figure 15:
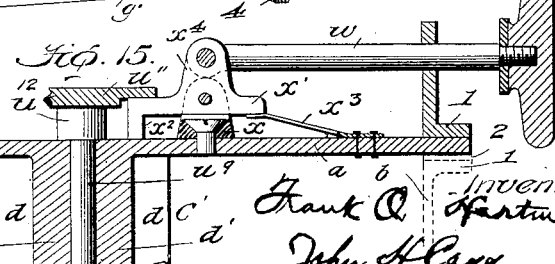

In the accompanying drawings, Figure 1 is a vertical cross-section of my improved circuit-breaker. Fig. 2 is a vertical cross-section taken at right angles to Fig. 1. Fig. 3 is a longitudinal cross-section. Fig. 4 is a plan view of the upper portion of the circuit-breaker, the cover of which is removed. Fig. 5 is a perspective view of my invention. Fig. 6 is a detail view, partly in section, showing the laminated contact and connected parts. Fig. 7 is a detail in front elevation of a bracket connecting one end of the magnetic coil to the connecting-piece of the circuit-breaker. Fig. 8 is rear perspective view of one of the laminated contacts. Figs. 9 and 10 are detail views in cross-section, showing the manner of securing the contact-blocks and the insulation. Fig. 11 is a detail in cross-section showing the manner of securing the casing and the connecting-piece. Fig. 12 is a detail view, partly in section, of the latch-releasing mechanism. Fig. 13 is a detail view, in side elevation, of the vertical shaft and the arms and springs secured thereto. Fig. 14 is a diagrammatic view of the electric circuit when broken and when complete. Fig. 15 is a view, partly in section, of a modification of the latch-releasing mechanism. Fig. 16 is a perspective detail view of the switch-arms and pivoted latches; and Fig. 17 is a top plan view of the complete device, showing the manually-operated handles for actuating the switch-arms.

The framework of the circuit-breaker comprises a bracket or table $a$, consisting of a flat plate, to the under face of which is secured the deep box $b'$ of rectangular shape and to the upper face of which is secured a similarly-shaped cover $b$, which latter incloses a smaller space above the bracket or table. The box portion $b'$ of the casing or framework and the cover $b$ are provided with flanges 1 1, between which is received the table $a$, the three being secured together by means of rivets or other suitable means, as shown. Between the point of juncture of the table and the box $b'$ is interposed a packing 2 for the purpose to be hereinafter set forth.

The table or bracket $a$ is provided with a hollow centrally-located depending portion $c'$, preferably made integral therewith. This depending portion or post $c'$ extends nearly to the bottom of the box $b'$, and between the ends $c^2$ of the post and the bottom of box $b'$ is interposed an interiorly-threaded washer $c^3$. The main body portion of the post $c'$ is preferably rectangular in shape, and upon two opposite faces thereof are formed deep longitudinal grooves or recesses $d\ d$, parallel with and separated from each other by means of ribs $d'$ $d'$ of less width than the width of post $c'$. The post projects downwardly at right angles to the table or bracket $a$. The other two plane faces $e$ $e'$ of the post $c'$ are provided with insulation contact-block holders $e^2$ $e^3$, secured thereto by means of screws $ff$, which screws pass through insulated sleeves 3 3, located in the contact-blocks and through the insulated plates $g$, $g'$, and $g^2$. The insulated contact-block holder $e^2$ is adapted to have superposed upon its outer face two separate and distinct contact-blocks $f'$ and $f^2$, separated from each other by the insulating-rib 4, integral with and projecting from the contact-block holder $e^2$, as shown in Figs. 3 and 9. The opposite block-holder $e^3$ has superposed thereupon the contact-block $f^3$. These contact-blocks are retained in place by means of the screws $ff$, which pass through apertures in the insulating-plates $g$ $g'$ $g^2$ and through the insulating-sleeves 3 3 in the contact-blocks, the threaded ends of the screws engaging the post $c'$. It is to be noted that the method of arranging the contact-blocks provides a means whereby one contact may be used for both switches, which results in a saving of time, labor, and material in the construction of a double-pole circuit-breaker.

The ribs $d'$ $d'$ are provided with laterally-extending interiorly-threaded apertures $h$ $h$, adapted to receive the threaded ends $h'$ $h'$ of a plurality of oppositely-extending parallel rods $h^2$ $h^2$ $h^3$ $h^3$. Laminated contacts $i$ $i$ are slidingly received upon the rods $h^3$ $h^3$, the rods passing through apertures $i'$ $i'$, formed through the contacts and forming ways or guides for the contacts when the latter are thrown into or out of contact with the blocks $f'$ $f^2$ $f^3$ to complete or break the circuit. The laminated contacts are each formed of a plurality of longitudinally-slotted plates of substantially V shape in contour, received and clamped between an inner plate $j'$ and an outer plate $j$. The inner plate $j'$ extends upwardly beyond the edge of the laminated contact and is provided with a semicircular recess 5, adapted to embrace the rod $h^2$ to serve as a guiding means during the movements of the contacts $i$ $i$ to retain them in alinement and insure direct and perfect contact with the blocks $f'$ $f^2$ $f^3$. A collar 6 is secured to each of these plates $j'$, which collar is received in the apertures $i'$ of the contacts and extends therethrough. The outer plates $j^2$ of the laminated contacts are made heavier in gage than are the inner plates and of greater length. This method of construction confines the arc to one point, as the plates $j^2$ $j^2$, by reason of their greater length, will remain in contact with the blocks $f'$ $f^2$ $f^3$ for a short time after the inner plates have been removed therefrom. The contacts are mounted upon insulated spools $k$ $k$, the ends of which will embrace the plates composing the contacts between them, and these spools are received upon the collars 6 6 of the plates $j''$ $j''$. Coil-springs $t'$ are mounted on the rods $h^3$ $h^3$, between the inner plates $j''$ $j''$ and the depending post $c'$, which springs tend to force the contact-plates $i$ $i$ away from the blocks $f'$ $f^2$ $f^3$.

Vertical shafts $m$ $m'$ are journaled to rotate in the table or bracket $a$. The bracket is provided with bearings $m^2$ $m^3$ integral therewith, within which the shafts $m$ $m'$ are journaled. These bearings extend both above and below the bracket or table $a$, the portion extending above the table having a large interiorly-threaded bore, within which an exteriorly-threaded washer $n'$ is received and retained in place by means of a shouldered threaded annular cap $n$. This construction forms a packing which, with the packing 2, operates to prevent the escape of the insulating liquid with which the box $b'$ is filled. The lower ends of shafts $m$ $m'$ depend some distance into box $b'$, and these shafts are provided near their lower ends with recesses $o$ $o$, formed therein and adapted to receive and retain the ends $o'$ $o'$ of the contact-springs $o^2$ $o^2$, which springs encircle or pass around the shafts and have the straight portions $p$ thereof bent into such an angle as will permit the free ends $p'$ $p'$ to bear against the outer surfaces of the laminated contacts, and these springs tend to force the contacts into engagement with the contact-blocks.

Switch-arms $p^2$ $p^2$ are adjustably secured upon the upper ends of the shafts $m$ $m'$, above the caps $n$ $n$, by means of set-screws $p^3$ $p^3$ and are capable of assuming the positions shown by dotted lines $s^4$ in Fig. 4 when the laminated contacts are out of engagement with the contact-blocks. The free ends of these switch-arms $p^2$ $p^2$ are provided with grooves or recesses $r$ $r$, formed laterally of the switch-arms, which latter are made thicker at their free ends, as shown in Fig. 13, and rollers $r'$ $r'$ are journaled in these slots. Two pairs of bosses $s'$ $s'$ project upwardly from the table or bracket $a$, and these bosses are slotted for the reception of a pair of latches $r^3$ $r^3$, pivotally secured thereto by the pins $t$, passing through the sides of the bosses and through the latches $r^3$ $r^3$. These latches diverge from each other at an angle, and at their shorter rear ends are provided with integral parallel extensions $u''$, which extensions may be chamfered, as shown in cross-section in Fig. 15. The forward ends of the latches $r^3$ $r^3$ are provided with lips or hook-shaped portions $r^2$ $r^2$, as shown in Fig. 12, and the latches are normally retained in their horizontal positions by means of springs $s^3$ $s^3$. The slots formed in the free ends of the switch-arms permit the latter to embrace the forward ends of the latches, the rollers $r'$ $r'$ resting directly thereon and operating to reduce the friction caused by the movement of the arms upon the latches. The lips $r^2$ $r^2$ are adapted to normally retain the arms in engagement with the latches.

The shafts $m\ m'$ extend upwardly through suitable perforations 7 7 in the cover $b$ and are provided at their outer ends with handles 8 8, whereby the circuit may be completed or broken manually by rotating the shafts.

When it is desired to force the laminated contacts $i\ i$ into engagement with the contact-blocks $f'\ f^2\ f^3$, the switch-arms $p^2\ p^2$ are turned inwardly toward each other, as shown in full lines in Fig. 4, until the rollers $r'\ r'$ pass over the lips or hooked portions $r^2\ r^2$ of the latches, which retain the arms in position against the tension of springs $t'\ t'$. It will be noted that the outer ends of the hook-shaped portions are curved or rounded to permit the rollers to pass over them and force the pivoted latches downward against the tension of springs $s^3\ s^3$, which springs return the latches to horizontal position after the passage of the rollers $r'\ r'$ over the hooked ends $r^2\ r^2$. When the switch-arms $p^2\ p^2$ are disengaged from latches $r^3\ r^3$ and have assumed the positions shown by dotted lines $s^4\ s^4$ in Fig. 4, the springs $o^2\ o^2$ and the laminated contacts $i\ i$ assume the positions shown by dotted lines in Fig. 3. The springs $o^2\ o^2$ exert a pressure against the laminated contacts when the switch-arms are in the position shown in full lines in Fig. 4 and insure a full and perfect engagement of the contacts with the blocks. When the switch-arms are disconnected from the latches, the coil-springs $t'\ t'$ on the rods $h^3\ h^3$ force the laminated contacts away from the blocks and automatically break the circuit, the pressure of springs $o^2\ o^2$ having been released by the rotary movement of the shafts $m\ m'$, to which they are secured, thus causing a rapid break.

The adjacent ends of the rods $h^2\ h^2\ h^3\ h^3$ are provided with reduced screw-threaded ends $h^4\ h^4$, upon which ends are fitted apertured plates $h^5\ h^5$, abutting against the shoulders formed by the reduced ends, and these plates are retained in place by means of nuts $h^7\ h^7$, the object being to afford an added rigidity to the rods as well as to strengthen and retain them parallel with each other.

The automatic action of my improved circuit-breaker is attained as follows: The rectangular frame $c$ is secured to depend from the box $b'$ in direct alinement with the depending post $c'$ by means of a hollow collar-bolt $u$, the inner end of which is threaded to engage the enlarged interiorly-threaded portion $u'$ of the hollow post $c'$. The opposite end or head $u^3$ of the collar-bolt is received in the bore 9 of the yoke $c$, which bore is provided with a restricted portion or annular shoulder 10, behind which the collar-bolt is received and operates to secure the yoke $c$ to the box $b'$. A solenoid $u^4$ is received and held within the yoke $c$ and surrounding the bore 9 thereof. A tube $u^5$ is received and fitted within the bore 9 of the yoke $c$, the upper end of the tube abutting against the annular shoulder 10 and inclosing the head $u^3$ of the collar-bolt, the bore 9 of the yoke and the bore of the depending post $c'$ being in alinement with each other. The head of the collar-bolt is conically recessed, as at 11. The lower end of the tube $u^5$ extends some distance below the rectangular yoke $c$, and an annular exteriorly-threaded plug $u^6$ is received within and engages the internal screw-threads formed in the end of the tube. The plug is also provided with internal screw-threads adapted to receive the threaded thumb-screw $u^7$. A core $u^8$, provided with a conical head $u^{10}$, is loosely received within the tube $u^5$, and the thumb-screw is provided with an enlargement 12 at its inner end, which abuts the core and by means of which the position of the core within the tube is regulated, the enlargement 12 constituting a stop to limit the downward movement of the core within the tube, said downward movement caused by the gravitation of the core. The current flowing through the solenoid operates to magnetize the core $u^8$ and causes it to move upward, more or less, in the tube $u^5$ toward the upper end of the coil, according to the amount of current flowing therethrough. The upward movement of the core will occur only when the flow of the electric current generates a magnetic field strong enough to overcome the attractive force of gravity. The distance between the top of the solenoid and the core is diminished or increased by means of the thumb-screw $u^7$ according to the amount of electric current passing through the coil. For instance, if the breaker were intended to operate to interrupt the circuit when a comparatively low current is passing through the coil the distance between the head $u^{10}$ and the top of the coil would be much less than when the circuit is to be broken as soon as a predetermined and comparatively high current is attained. A suitable gage 15 is located on the depending tube $u^5$, as shown in Fig. 5, whereby the proper adjustment of the core $u^8$ can be accurately determined. A collar-pin $u^9$ is loosely and slidingly received in the hollow depending post $c'$, the head $u^{12}$ of which collar-pin normally rests upon the table or bracket $a$ to limit the downward movement of the pin. The head $u^{12}$ is located directly beneath the integral parallel trip extension $u^{11}$ of the latches $r^3\ r^3$. The lower end of the collar-pin passes through the hollow collar-bolt $u$ and into the tube $u^5$ in position to be struck by the core $u^8$ and forced upward. When the amount of current required to furnish power for or to operate any electrical device has been determined, the core $u^8$ is adjusted in the tube by means of the thumb-screw $u^7$ to a position wherein any excess of current will cause the core to rise and contact with the collar-pin $u^9$ by creating a magnetic field which is stronger than the force of gravity. When this occurs, the head $u^{12}$ of the collar-pin engages and forces the ends of the extension-trips $u^{11}\ u^{11}$ of the pivoted latches $r^3\ r^3$ upward, which depresses the forward ends of the latches against the tension of springs $s^3$ $s^3$, which permits the switch-arms $p^2$ $p^2$ to disengage themselves from the latches and rotating the shafts $m$ $m'$ to release the pressure of springs $o^2$ $o^2$ on the laminated contacts $i$ $i$, which are forced away from the contact-blocks $f'$ $f^2$ $f^3$ and break the circuit.

A hand-release is also provided. This consists of a pair of studs $w'$ $w^2$, projecting upward from the table or bracket $a$ and provided with alined apertures within which is received the bar $w$, the inner beveled end $w^5$ of which is located just behind the ends of the extension-trips $u^{11}$. A coil-spring $w^6$ is mounted upon the bar between the studs $w'$ $w^2$, one end of which spring bears against the stud $w'$ and the opposite end of which bears against a collar $w^4$, secured to the bar $w$ by means of a pin $w^3$ passing through the bar and collar. This construction operates to force the bar $w$ away from the extension-trips $u^{11}$, the outer end of the bar passing through the cover $b$ and provided with a handle, as shown in Fig. 4. When it is desired to release the switch-arms $p^2$ $p^2$ from the latches, the bar $w$ is pushed inward, whereupon the beveled end $w^5$ is forced into engagement with the extension-trips $u^{11}$, which ride up on the bevel, forcing the forward ends of the latches downward against the tension of the springs $s^3$ $s^3$ and releasing the switch-arms.

A modification of the hand-release is shown in Fig. 15, in which a bifurcated stud $x$ is secured to the table $a$ by means of a screw, rivet, or other suitable means. Pivotally secured between the limbs of this stud is an angle-lever $x'$ of general angular shape, the front end of which extends beneath the ends of the extension-trips $u^{11}$ and is provided with a leg $x^2$, the lower end of which rests upon the table $a$ and operates to limit the movement of the lever $x'$ in that direction. A spring $x^3$, suitably secured, has its free end extending beneath the rear end of the lever and normally tends to retain the leg $x^2$ in contact with the table $a$. To an upward projection $x^4$ on the lever $x'$ is pivotally secured one end of the hand-release rod $w$, which projects outside the casing or cover $l$. From this description, taken in connection with the drawings, it will be understood that a sharp pull on rod $w$ will rock the lever $x'$ on its pivot against the tension of spring $x^3$ and cause the forward end of the lever to engage and force the ends $u^{11}$ of the extension-trips upwardly to release the switch-arms. A slight space is left between the lever $x'$ and the bifurcated stud in order to permit of the rocking movement of the lever.

The bifurcated blocks $f'$ $f^2$ are secured to a connecting-piece $z$, which in turn is connected with a post $z'$, passing through the bottom of the box $b'$ and in contact with any suitable electrical medium. The post $z'$ is partially screw-threaded and is provided with a shouldered collar $z''$, the shoulder of which rests upon the box $b'$. Surrounding the collar exteriorly of the box $b'$ is a washer $z^3$, and secured upon the bolt beneath and in contact with the washer is a packing-ring $z^4$, held tightly in position by means of a nut $z^5$, received upon the threaded portion of the post. The dividing-plate 4, which separates the contact-blocks $f'$ $f^2$, also separates the connecting-piece $z$, the connecting-piece being supported at either end in the manner above set forth.

It is evident that many changes might be made in the form and arrangement of the parts described—such, for instance, as the adjustment of the core $u^8$ by means of weights, springs, or other well-known mechanical expedients—without departing from the spirit and scope of my invention, and hence I do not wish to limit myself to the exact features herein set forth; but, Having fully described my invention, what I claim as new, and desire to secure by Letters Patent, is—

1. A circuit-breaker comprising a case, a table secured within the case, the table provided with a depending post, a plurality of bars, the ends of which are removably attached to the depending post, contact-blocks secured thereto, laminated contacts slidingly mounted on the lower bars, a guide-plate secured to the inner side of each of the laminated contacts, the guide-plates engaging the upper bars, shafts journaled in bearings in the table, arms adjustably secured upon the upper ends of the shafts, latches with which the free ends of the arms are adapted to removably engage, contact-springs secured to the shafts within the casing, the free ends of which are adapted to engage the laminated contacts, tension means mounted on the lower bars and adapted to engage the laminated contacts in opposition to the contact-springs, the tension means adapted to force the laminated contacts out of engagement with the contact-blocks when the arms are released from the latches.

2. An automatic magnetic circuit-breaker comprising a casing composed of upper and lower portions, a table supported between the upper and lower portions, a hollow post depending from the table, contact-blocks secured thereto, an insulating liquid contained in the lower portion, shafts journaled in the table-arms secured to the upper ends of the shafts, a plurality of bars secured to the depending post, laminated contacts slidingly mounted upon the lower bars, contact-springs secured to the lower ends of the shafts, the free ends of the springs adapted to removably retain the contacts in engagement with the blocks, latches pivotally mounted upon the table, the arms adapted to removably engage the latches, a yoke secured to the lower portion of the casing and having a central aperture therein in alinement with the bore of the depending post, a tube received in the aperture, a coil surrounding the tube, a core adjustably supported therein, a collar-pin loosely received in the bore of the depending post, the head of the collar-pin adapted to engage and move the latches when the core is forced thereagainst whereby to release the arms and break the circuit.

3. A circuit-breaker comprising a casing, laminated contacts supported within the casing, contact-blocks with which the contacts are adapted to have removable engagement, resilient means engaging the contacts for retaining them in contact with the blocks, a yoke secured to the case, a solenoid received within the yoke, the core of the solenoid adjustably mounted therein, a collar-pin loosely supported in the casing, the core adapted to engage and move the collar-pin, pivoted latches arranged to be operated by the collar-pin, arms removably held by the latches, and means connecting the arms and the resilient means whereby the disengagement of the contacts and contact-blocks is effected.

4. An automatic magnetic circuit-breaker comprising a casing, a table supported therein, a hollow post depending from the table, a plurality of bars secured to the sides of the depending post, contact-blocks secured to the sides of the depending post, contacts slidingly mounted on the bars, shafts journaled in the table, arms secured to the shafts, the free ends of the arms provided with rollers journaled therein, latches pivotally mounted on the table, the rollers adapted to engage and be removably retained by the latches, a yoke secured to the casing, a solenoid supported therein, the core of the solenoid adjustably mounted in alinement with the bore of the depending post, a collar-pin loosely supported in the bore of the depending post, the head of the collar-pin adapted to engage the pivoted latches, the core adapted to engage the collar-pin, and cause the latter to engage the pivoted latches releasing the roller-arms, and manually-operated means for actuating the pivoted latches.

5. An automatic magnetic circuit-breaker comprising a casing, a table supported therein, a post depending from the table, the post located centrally of the table and casing, the lower end of the post provided with an aperture, a hollow collar-bolt removably received in the aperture, and a yoke supported by the collar-bolt.

6. An automatic magnetic circuit-breaker comprising a casing consisting of upper and lower portions, a table secured between the upper and lower portions, a post depending from the table into the lower portion of the casing, bars secured to the depending post, contacts slidingly mounted on the bars, blocks insulated from and removably secured to the post, the table and lower portion of the casing forming a compartment, liquid insulating material filling the compartment and submerging the operative mechanism.

7. An automatic circuit-breaker comprising a casing, a table supported therein, a hollow post depending from the table, shafts extending into the casing, arms secured to the upper ends of the shafts within the casing, contact-springs secured to the lower ends of the shafts, bars secured to the depending post, insulating holders secured to the sides of the post, contact-blocks received in the holders, contacts slidingly mounted upon the bars, a solenoid secured outside the casing, a core, a thumb-screw for adjusting the position of the core, the core in alinement with the bore of the depending post, a collar-pin loosely received in the hollow post, the end of the collar-pin adapted to be struck by the core, pivotal latches with which the arms are removably connected, the collar portion of the pin resting upon the table beneath the rear ends of the latches, the pin adapted to engage the latches when struck by the core to release the arms.

8. An automatic circuit-breaker comprising a casing, the casing consisting of upper and lower flanged portions, a table dividing the casing, the table supported between the flanges of the upper and lower portions, packing interposed between the table and the lower portion, insulating liquid filling the lower portion of the casing, operating mechanism located in the lower portion of the casing, a solenoid secured to the casing, and means operated by the action of the solenoid for breaking the circuit established within the casing.

9. An automatic circuit-breaker comprising a suitable support, a table, a post depending therefrom, a plurality of pairs of extending parallel bars secured to two sides of the post, insulated contact-blocks secured to the remaining sides of the post, one of the blocks consisting of two sections insulated from each other, insulated contacts slidingly mounted upon the lowermost bars, guiding means secured to the contacts and engaging the uppermost bars, means normally tending to force the contacts away from the blocks, shafts rotatably supported in the table, means secured to the shafts and adapted to force the contacts into engagement with the blocks, arms secured to the shafts above the table, pivoted latches supported upon the table, means for normally retaining the latches in horizontal position, the arms adapted to engage the forward ends of the latches, a solenoid secured to the frame and means operated by the solenoid for rocking the latches to release the arms therefrom.

10. An automatic circuit-breaker comprising a support, a table, a post depending therefrom, insulated contact-blocks secured thereto, slidingly-mounted insulated laminated contacts, means normally tending to force the contacts away from the blocks, rotatable shafts, arms carried by the shafts and adapted to retain the latter in one position, means carried by the shafts which tend to force the contacts into engagement with the blocks, means for locking the arms to retain the contacts in engagement with the blocks, a solenoid and means operated by the solenoid whereby to cause the release of the arms and permit the first-named means to force the sliding contacts away from the blocks.

11. An automatic circuit-breaker comprising a casing, insulated contact-blocks located therein, slidingly-mounted insulated contacts adapted to engage the blocks, means for normally forcing the contacts away from the blocks, revoluble shafts, means carried by the shafts and adapted to force the contacts against the blocks, arms carried by the shafts, pivoted latches engaged by the free ends of the arms, the latches adapted to normally retain the arms, means for retaining the latches normally in horizontal position, a solenoid, and means operated by the solenoid for rocking the latches to release the arms therefrom.

12. An automatic circuit-breaker comprising a casing, insulated contact-blocks located therein, slidingly-mounted insulated contacts adapted to engage the blocks, means for normally forcing the contacts away from the blocks, revoluble shafts, means carried by the shafts and adapted to force the contacts against the blocks, arms carried by the shafts, pivoted latches engaged by the free ends of the arms, the latches adapted to normally retain the arms, means for retaining the latches normally in horizontal position, and a hand-release adapted to rock the latches to release the arms therefrom.

13. A mechanism for interrupting a circuit comprising a plurality of isolated stationary contacts, bridges connecting the contacts, suitably-supported movable members independent of the bridges, yielding means carried by the movable members independent of and adapted to engage the bridges to force them against the contacts, mechanism for retaining the movable members in such position as to hold the means carried by such movable members against the bridges to retain the latter in engagement with the contacts, and independent automatic means for forcing the bridges away from the contacts when the movable members are released, the yielding means and the automatic means coöperating to rotate the movable members.

14. An automatic cut-out comprising a suitable support, contact-blocks and rods secured thereto, sleeves slidingly mounted on the rods, insulating-collars carried by the sleeves, contacts supported on the collars and adapted to engage the contact-blocks, yielding means for normally forcing the contacts away from the contact-blocks, means normally operating to force the contacts against the contact-blocks, locking means for retaining the contacts against the blocks and automatically-operated means for engaging the locking means and permitting the yielding means to force the contacts away from the blocks.

15. A cut-out comprising a suitable support, blocks and guides secured thereto, contacts movably mounted upon the guides, yielding means for normally forcing the contacts away from the blocks, movable shafts suitably supported, means on the shafts adapted to engage the contacts to force them against the blocks, arms secured to the shafts, locking means with which the arms engage and by which they are held when the contacts are in engagement with the blocks, and automatically-operated means adapted to engage the locking means to release the arms and permit the yielding means to force the contacts away from the blocks.

16. A cut-out comprising a suitable support, blocks and guides secured thereto, contacts movably mounted upon the guides, yielding means for normally forcing the contacts away from the blocks, movable shafts suitably supported, means on the shafts adapted to engage the contacts to force them against the blocks, arms secured to the shafts, rollers on the arms, locking means with which the rollers engage and by which they are held when the contacts are in engagement with the blocks, and automatically-operated means adapted to engage the locking means to release the arms and permit the yielding means to force the contacts away from the blocks.

17. A cut-out comprising a suitable support, blocks and guides secured thereto, contacts movably mounted upon the guides, yielding means for normally forcing the contacts away from the blocks, movable shafts suitably supported, means on the shafts adapted to engage the contacts to force them against the blocks, arms secured to the shafts, locking means with which the arms engage and by which they are held when the contacts are in engagement with the blocks, the locking means consisting of pivoted latches, enlargements on the ends of the latches behind which the arms are received, springs for retaining the latches in their normal position, and automatically-operated means adapted to engage the locking means to release the arms and permit the yielding means to force the contacts away from the blocks.

18. A cut-out comprising a suitable support, blocks and guides secured thereto, contacts movably mounted upon the guides, yielding means for normally forcing the contacts away from the blocks, movable shafts suitably supported, means on the shafts adapted to engage the contacts to force them against the blocks, arms secured to the shafts, locking means with which the arms engage and by which they are held when the contacts are in engagement with the blocks, automatically-operated means adapted to engage the locking means to release the arms and permit the yielding means to force the contacts away from the blocks, and a manually-operated means for engaging the locking means to release the arms.

19. A cut-out comprising a suitable support, blocks and guides secured thereto, contacts movably mounted upon the guides, yielding means for normally forcing the contacts away from the blocks, movable shafts suitably supported, means on the shafts adapted to engage the contacts to force them against the blocks, arms secured to the shafts, locking means with which the arms engage and by which they are held when the contacts are in engagement with the blocks, automatically-operated means adapted to engage the locking means to release the arms and permit the yielding means to force the contacts away from the blocks, and a manually-operated means for engaging the locking means to release the arms, the manually-operated means consisting of a rod adapted to engage and move the locking means and a spring for normally retaining the rod out of engagement with the locking means.

20. A circuit-breaker comprising, in combination with a source of electricity, a plurality of isolated contacts in circuit with the electrical source, a suitably-supported bridge for connecting the contacts, means normally tending to force the bridge away from the contacts, a rotatable member independent of the bridge, a resilient arm carried by the member, the arm adapted to engage and move the bridge against the contacts, means for locking the rotatable member in one of its adjusted positions and an automatic releasing means therefor.

Signed at Mansfield, Ohio, this 10th day of March, 1902.

FRANK O. HARTMAN.

Witnesses:
JAMES CHESTER COSS,
JOSIAH BRINKERHOFF.